July 28, 1964     J. F. KAHLENBERG     3,142,385
CULTURE TUBE HOLDER
Filed Sept. 7, 1961

INVENTOR.
JAMES F. KAHLENBERG
BY John W. Michael
ATTORNEY

United States Patent Office 3,142,385
Patented July 28, 1964

3,142,385
CULTURE TUBE HOLDER
James F. Kahlenberg, P.O. Box 3636, Sarasota, Fla.
Filed Sept. 7, 1961, Ser. No. 136,620
3 Claims. (Cl. 211—74)

This invention relates generally to a holding device for test tubes, and more particularly to a culture tube holder that will permit its extensive manipulation while containing culture tubes without permitting them to become dislodged from it, yet will allow easy withdrawal of the culture tubes.

In various methods of chemical analysis and in particular in culture testing, extensive handling and manipulation of the test tubes or culture tubes is required. In particular many occasions arise where it is desirable to subject a number of culture tubes simultaneously to the same type of manipulation. This is desirable both from an efficiency standpoint as well as for sake of comparative analysis. For example, in the cultivation of microorganisms of tissue it is often required that a group of culture tubes be held for a prolonged period of time with their longitudinal axes at or near the horizontal so as to provide a greater surface area of the culture medium. Also during cleaning and sterilizing procedures the culture tubes undergo quite severe handling. On occasions such as these it is desirable to equip the culture tube rack with means that will allow the safe handling of a number of culture tubes as a unit.

In view of the fact that the culture tubes are also manipulated for sake of comparative analysis, it is important that the tubes do not materially change their position relative to each other during such manipulation. The assurance of such stability is also a function of the culture tube rack.

It is an object of this invention to provide a novel test or culture tube holding rack that will facilitate manipulation of the tubes as a unit while held within such rack.

It is another object of this invention to provide a culture tube rack that will hold the culture tubes firmly in place, yet allow easy insertion and removal of them and can be easily cleaned and sterilized.

It is a further object of this invention to provide a culture tube rack that will position the culture tubes uniformly in relation to the rack, regardless of the position of the rack or of commercial variances in culture tube diameter.

Other objects will appear hereinafter.

The applicant accomplishes these objects by providing resilient wires along each side of the aperture through which the culture tube is inserted, whereby the wires in cooperation with the aperture exerts a pressure on the culture tube inserted therein, to thus provide a firm grip on such tube.

Figure 1:
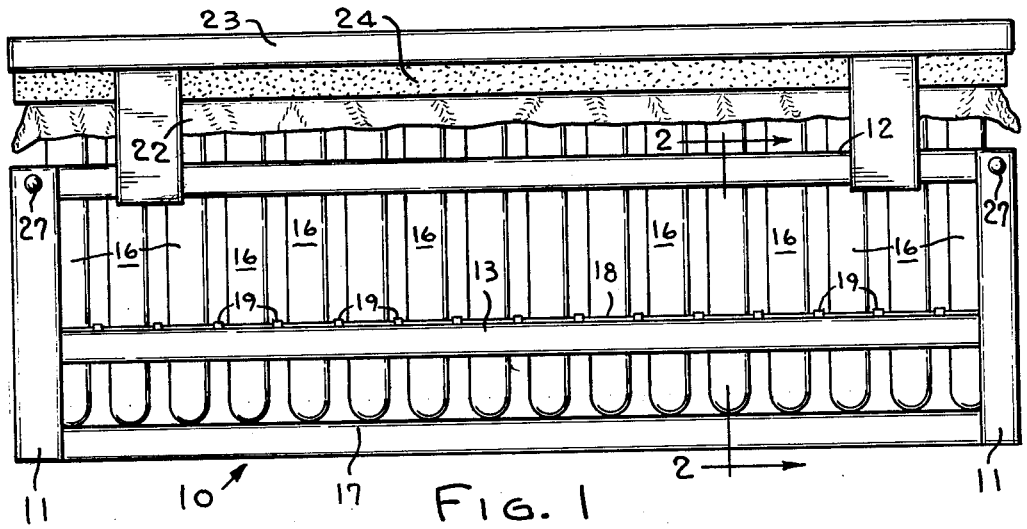
FIG. 1 is a side view of a culture tube rack embodying the applicant's invention and shown as used in cultivation practice.

In describing the invention in reference to the drawings, FIG. 1 depicts the embodiment of the invention in a commercial culture tube rack 10. As illustrated, the basic elements of the rack consist of three parallel plate members 12, 13, and 17, supported relative to each other by end members 11, so as to constitute a rigid box type structure. The front and rear edges of plates 12, 13 and 17 are bent downwardly as shown in FIG. 2 and the edges of end members 11 are bent inwardly to facilitate attachment of the horizontal plates to the vertical end members by welding or other suitable means.

The upper plate 12 and the intermediary plate 13 each have a plurality of coaxially aligned apertures 14 and 15, respectively, of sufficient size to permit insertion of commercial culture tubes 16. The bottom plate 17 provides a stop and support for the inserted tubes.

One significant feature of the rack is the embodiment of pairs of resilient wires 18, 18 mounted at the sides of apertures 15 in the middle plate 13 by means of eyelets 19.

Figure 2:
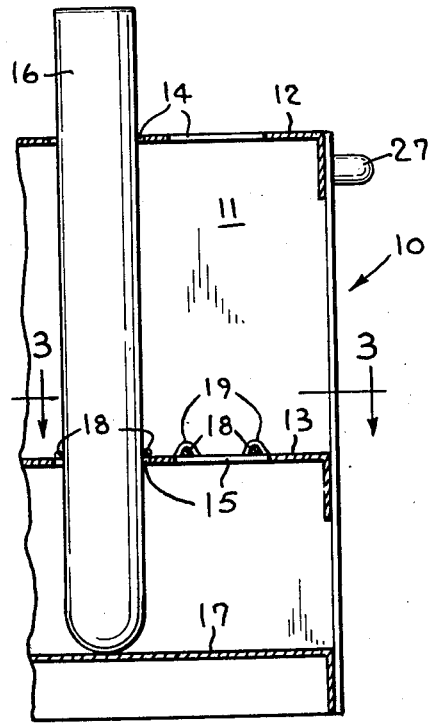
FIG. 2 is a partial cross-sectional view taken along lines 2—2 of FIG. 1.
Figure 3:
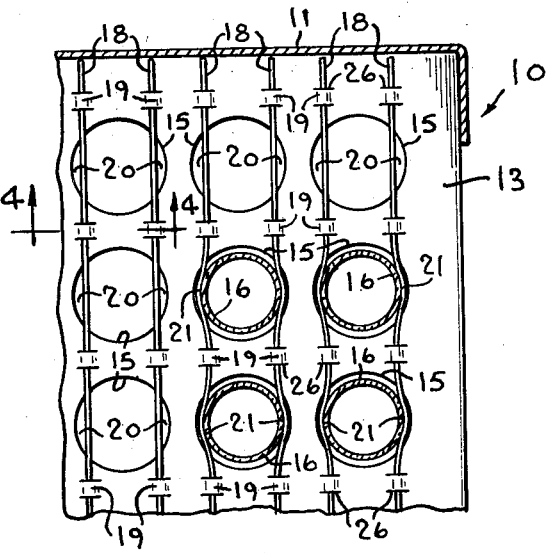
FIG. 3 is a cross-sectional view taken along lines 3—3 of FIG. 2.

As is best illustrated in FIGS. 2 and 3 the distance between each pair of wires 18, 18 is slightly smaller than the diameter of the aperture 15. The wires are positioned so that they partially overlie the apertures to thus cut off an equal segment 20 on each side of each aperture. For the sake of simplicity of construction, the apertures are so located as to permit a pair of continuous wires 18 to span a longitudinal row of apertures.

Figure 4:
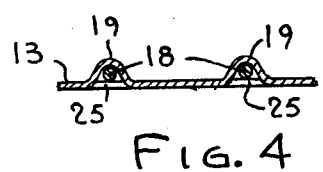
FIG. 4 is a cross-sectional view taken along lines 4—4 of FIG. 3.

The wires are affixed to the intermediary plate 13 by virtue of being passed through apertures 25 which are defined by the eyelet members 19. The eyelet members 19 are easily formed from the same stock as the intermediate plate by stamping a tunnel shaped section as shown in FIG. 4 at the desired locations in the intermediate plate. As illustrated, two cuts 26, 26 are made in the stock to facilitate the free passage of a wire 18 underneath the deformed stock. From the foregoing it will be appreciated that the entire rack can be readily fabricated by first stamping and bending plates 12, 13, 17 and 11 to shape, then inserting wires 18 through eyelet openings 25 in plate 13 and finally attaching the plates together by welding or other suitable means. With the parts so assembled and fastened together, wires 18 will be freely held in place in eyelet openings 25 by side members 11 but will be free to curve around the periphery of the culture tubes.

The gripping action of the wires is illustrated by FIGS. 2 and 3. As shown, upon insertion of a culture tube, the wires 18 are spread apart and deform so as to partially curve around the culture tube and thus resiliently grip the tube along a line contact 21.

It is important to note that not only is movement perpendicular to the wires prevented but that motion in all directions is checked by virtue of the fact that the wire curves around the peripery of the culture tube.

As is is shown in FIG. 2, the culture tube inserted may be somewhat undersize, thus not coming in contact with the sides of apertures 15, and still be firmly secured in position by the wires.

By using stainless steel spring tempered wires, and positioning them in respect to the apertures as above described, the gripping force is sufficient to prevent the tubes from dropping out of the rack even if the rack and tubes are turned upside down. However, the force is not so large as to hamper the manual removal of the culture tubes.

The utility of the wire gripping action is exemplified by a description of the specific culture tube rack shown in FIG. 1. As previously mentioned, in cultivation work it is often desirable to place the filled culture tubes in a near horizontal position, and to so maintain them for a prolonged period of time. Under such conditions sealing of the tubes is of prime importance. An expedient method is to cover the openings of all the culture tubes within the rack with a sheet of non-porous plastic wrapping 22, then place a resilient pad 24 and a retaining cover 23 over the covered tubes to thus exert sufficient pressure to seal the tubes. The rack is then tilted forward to rest on tilting knobs 27 to position the tubes near the horizontal position. The resilient wires 18 in combination with the apertures 14 and 15 maintain the tubes in a perpendicular position relative to the bottom plate 17 and to the cover 23, and thus uniform sealing is facilitated. After the cell suspensions in the tubes have been allowed to incubate they can be individually and easily removed for inspection while the remaining tubes are held securely in the rack. Upon completion of the tests, the rack and tubes can he handled as a unit and washed, covered with aluminum foil, and sterilized with the tubes in place.

While the drawings show wires 18, 18 attached only to the intermediary plate 13, it will be obvious to one versed in the art that such wires could be attached to the top plate only or to both top and the intermediary plates depending upon the desirability of such arrangements. It is also noted that wires 18, 18 could be attached to either or both the top and bottom surfaces of plates 13 and 17 thereof.

Although but a single embodiment has been illustrated and described, it will be apparent to those skilled in the art that various changes and modifications may be made therein without departing from the spirit of the invention or from the scope of the appended claims.

I claim:

1. Means for securing test tubes within a rack comprising a member having a row of tube receiving openings therein, two resilient wires retained on said member and located in parallel relationship on each side of said row so as to partially overlie each opening of said row, said resilient wires being retained on said member by virtue of eyelet means and said wires freely extending through said eyelet means.

2. The combination according to claim 1 wherein said resilient wires partially overlie each of said openings in a manner as to cut off substantially equal segments of each opening.

3. A test tube rack comprising, top, middle, and bottom spaced parallel plates rigidly supported with respect to each other by air pair of interconnecting members, said middle and top plates having rows of axially aligned apertures therein, said middle plate having a pair of resilient wires for each row of apertures so positioned that each wire of the pair partially overlies all of the apertures of the row, said wires being maintained on an in contact with said middle member by virtue of eyelet members with said wires freely extending through said eyelet members.

References Cited in the file of this patent

UNITED STATES PATENTS

| | | |
|---|---|---|
| 255,399 | Upham | Mar. 2, 1882 |
| 910,659 | Ford | Jan. 26, 1909 |
| 1,300,629 | Macaw | Apr. 15, 1919 |
| 1,463,554 | Pierman | Feb. 31, 1923 |
| 2,341,496 | Zethmayr | Feb. 8, 1944 |
| 2,459,333 | McKinley | Jan. 18, 1949 |
| 2,519,800 | Tichenor | Aug. 22, 1950 |
| 2,722,317 | Goodwin | Nov. 1 1955 |
| 2,917,183 | Seelye | Dec. 15, 1959 |

UNITED STATES PATENT OFFICE
CERTIFICATE OF CORRECTION

Patent No. 3,142,385                                                           July 28, 1964

James F. Kahlenberg

It is hereby certified that error appears in the above numbered patent requiring correction and that the said Letters Patent should read as corrected below.

Column 4, line 10, for "air" read -- a --; line 15, for "an" read -- and --.

Signed and sealed this 24th day of November 1964.

(SEAL)
Attest:

ERNEST W. SWIDER                                                 EDWARD J. BRENNER
Attesting Officer                                                     Commissioner of Patents